United States Patent
Tremitiere et al.

(10) Patent No.: US 10,669,440 B2
(45) Date of Patent: Jun. 2, 2020

(54) DECORATIVE IMAGING PROCESS USING FIBROUS NIB MARKERS WITH SPECIFIC DISPERSE DYE COMPOSITIONS

(71) Applicant: Esprix Technologies, LP., Sarasota, FL (US)

(72) Inventors: Tonya Tremitiere, Bradenton, FL (US); Mark William Cummings, Lakewood Ranch, FL (US); Jana Petrova, Ellenton, FL (US); Jeff Lee Morgan, Sarasota, FL (US); Mandy Lehman Smith, North Port, FL (US); John F. Cooper, Hendersonville, NC (US)

(73) Assignee: ESPRIX TECHNOLOGIES, LP, Sarasota, FL (US)

( * ) Notice: Subject to any disclaimer, the term of this patent is extended or adjusted under 35 U.S.C. 154(b) by 0 days.

(21) Appl. No.: 16/432,372

(22) Filed: Jun. 5, 2019

(65) Prior Publication Data
US 2019/0284407 A1 Sep. 19, 2019

Related U.S. Application Data

(63) Continuation of application No. PCT/US2018/067645, filed on Dec. 27, 2018.

(60) Provisional application No. 62/708,866, filed on Dec. 27, 2017.

(51) Int. Cl.
| | | |
|---|---|---|
| *C09D 11/17* | (2014.01) | |
| *B43K 1/12* | (2006.01) | |
| *B43K 8/02* | (2006.01) | |
| *D06P 5/28* | (2006.01) | |

(52) U.S. Cl.
CPC ............ *C09D 11/17* (2013.01); *B43K 1/12* (2013.01); *B43K 8/022* (2013.01); *D06P 5/006* (2013.01)

(58) Field of Classification Search
None
See application file for complete search history.

(56) References Cited

U.S. PATENT DOCUMENTS

| | | | | |
|---|---|---|---|---|
| 4,062,644 A * | 12/1977 | Sponaes | ............ | C09D 11/033 8/471 |
| 4,082,467 A * | 4/1978 | Kaplan | ............ | B43K 8/024 106/31.34 |
| 4,211,528 A * | 7/1980 | Cuvelier | ............ | C09B 67/0082 8/471 |
| 4,689,078 A * | 8/1987 | Koike | ............ | C09D 11/328 106/31.33 |
| 4,725,849 A * | 2/1988 | Koike | ............ | D06P 5/30 347/100 |
| 5,028,262 A * | 7/1991 | Barlow, Jr. | ............ | C09D 11/104 522/104 |
| 5,642,141 A * | 6/1997 | Hale | ............ | B41F 16/02 347/213 |
| 8,425,029 B2 * | 4/2013 | Xu | ............ | B41J 2/17593 347/100 |
| 10,052,866 B2 * | 8/2018 | Cooper | ............ | B41M 5/41 |
| 2009/0189968 A1 * | 7/2009 | Yokozawa | ............ | B41M 5/42 347/200 |
| 2010/0043152 A1 * | 2/2010 | Terao | ............ | D06P 1/16 8/468 |
| 2011/0297040 A1 * | 12/2011 | Chen | ............ | C09D 11/324 106/31.58 |
| 2015/0152591 A1 * | 6/2015 | Asami | ............ | G03G 7/0093 8/543 |

FOREIGN PATENT DOCUMENTS

CN 102040882 A * 5/2011

OTHER PUBLICATIONS

Search Report from PCT/US2018/067645, dated Mar. 28, 2019; 4 pages.*
Written Opinion of the International Search Authority dated Mar. 28, 2019 for PCT/US2018/067645; 10 pages.*
Disperse Yellow 23, https://chem.nlm.nih.gov/chemidplus/rn/6250-23-3; no date available; 2 pages.*
English translation of CN 102040882, May 2011; 5 pages.*

* cited by examiner

*Primary Examiner* — Helene Klemanski
(74) *Attorney, Agent, or Firm* — Dinsmore & Shohl LLP; Weston R. Gould

(57) ABSTRACT

Provided are processes of placing an image on an object that includes optionally filling a hand held nib-based marker with a child and environmentally friendly aqueous based heat transfer disperse dye ink composition, and imaging an intermediate substrate with the marker. A process optionally further includes optionally drying the image, optionally heating the intermediate substrate, optionally placing the inked intermediate substrate in contact with a dye receptive surface of a receptive object, and optionally transferring the image to the receptive object by application of sufficient heat and pressure.

28 Claims, No Drawings

DECORATIVE IMAGING PROCESS USING FIBROUS NIB MARKERS WITH SPECIFIC DISPERSE DYE COMPOSITIONS

CROSS REFERENCE TO RELATED APPLICATIONS

This application is a U.S. National Phase of PCT/US2018/067645 filed Dec. 27, 2018, which depends from and claims priority to U.S. Provisional Patent Application 62/708,866 filed Dec. 27, 2017, the entire contents of which are incorporated herein by reference.

FIELD

The invention relates to a process for using a fibrous nib marking pen with a low viscosity, non-clogging, consumer and environmentally friendly heat transfer disperse dye ink composition and the use of that fibrous nib marker to image an intermediate substrate, optionally plain paper, and sequentially transferring the dye image to a receptive surface using a suitable combination of heat, pressure and time. Alternatively, the fibrous nib marker can be used to directly decorate a substrate with the heat transfer ink and the dye image fixed by a combination of heat, pressure and time.

BACKGROUND

A technique suitable for decorating many types of textiles is the use of disperse dye inks. Disperse dyes are solid at room temperature but vaporize (sublimate) at elevated temperature and then condense back to solid when cooled. In the vapor state these dyes are adsorbed into polyester or nylon fibers and form a permanent image when cooled. These images are wash and abrasion resistant and do not alter the feel of the textile.

Sublimation printing is also suitable for decorating almost any hard good item that has a dye-receptive polymer coating such as polyester. More recently sublimation inks have found use in inkjet printers, particularly for decorating textiles.

The concept of heat transfer printing of sublimable dyes was demonstrated by Blake in 1968 when he produced an offset ink using a solvent dye and was able to transfer those dyes to a cloth substrate. Later the concept was extended to heat transfer inks for other conventional printing techniques. More recently both dry and liquid toners as well as inkjet inks have been designed to be printed by digital techniques onto coated or uncoated substrates and the dye subsequently transferred to a dye-receptive surface. These processes have become a convenient technique for decorating certain types of textiles and novelty items. While these digital techniques are suitable for their purpose there is still a need for a simple technique where crafters can customize items such as textiles, ceramics, and other novelty items. A solution to this problem is to use marking pens that contain a suitable ink. Such markers have become very common and are available with a variety of traditional and specialty inks. Fibrous nib-based markers are a particularly suitable solution for producing customized novelty items and it would be desirable to have a nib-based marker that contained sublimable dye-based inks.

A variety of fibrous nib constructions have been designed for use in marking pens where the nib functions to wick an ink from a reservoir and dispense the ink onto a substrate or other surface. There are at least three types of nib constructions. The earliest type nib was based on wool felt and these formed the basis of the so-called "felt-tip" markers. A second type nib construction is based on nonwoven synthetic fibers such as drawn nylon, polyethylene or polypropylene that are then combined with a resin such as melamine and the composition sintered or cured, and then milled to the desired shape. A third type fibrous nib is formed by compressing polymer particles to produce porous wicking fibers that can be formed into bundles of a desired shape. These synthetic nibs may also have grooves for improved ink flow. In each case the nib is designed to wick an ink along its length and deposit the ink at a tip. More detail on synthetic fiber porous nibs can be obtained in patents U.S. Pat. No. 5,672,021 to Herman et al., U.S. Pat. No. 5,885,020 to Rossi, U.S. Pat. No. 6,117,260 to Rossi, U.S. Pat. No. 5,909,978 to Giordano, et al. or U.S. Pat. No. 8,852,122 to Mao, et al. The synthetic fiber nibs have an advantage over felt nibs in that both aqueous or solvent inks as well as inks with high pigment loading can be used. These porous plastic nib pens have been used to dispense many different liquid solutions or dispersions for application in writing instruments, children's coloring markers, dry erase markers, and artist's decoration inks. Inks used for these applications are typically designed to print directly on a substrate and produce a permanent mark. Such ink compositions would include a polymeric binder to fix the pigment to the substrate. For example, U.S. Pat. No. 5,043,013 to Kluger, et al. discloses washable polymer-based inks and their possible use in nib-type markers. There is no indication that Kluger used pigment-based disperse dyes in these marker pens and particularly sublimation dye inks of the composition of the present disclosure. U.S. Pat. No. 6,561,713 to Sukhan discloses fibrous nib markers for printing an aluminum metallic pigment dispersion. U.S. Pat. No. 6,881,000 to Perlman discloses nib markers with large channels that allow deposition of large size phosphorescent pigments. U.S. Pat. No. 7,208,036 to Fukuo, et al. discloses water-based pigment compositions for use in similar nib markers. However this application also relates to using relatively large size aluminum pigments that do not form a stable dispersion. Disperse dyes are not mentioned in any of these applications.

The use of nib tip marking pens with sublimation inks is also known in the art. For example U.S. Pat. No. 4,062,644 issued to Graphic Magicians discloses a transfer ink to be used with a felt tip marker pen. There is no mention in this patent that the disperse dyes are milled to a specific small particle size and then suspended using dispersants that will help prevent dye particles from aggregating. Other disadvantages of the Graphic Magician inks relate to the use of resins and solvents that are not consumer friendly. U.S. Pat. No. 4,082,467 to Kaplan also discloses a felt-tip marker pen and dye dispersion of vaporizable disperse dyes. In this example the dye is first dispersed with linseed oil and includes 40-50% of a soluble resin such as hydrogenated resin. This dispersion is then diluted with water, additional soluble resin, and 80-90% of a polyalcohol. This composition also suffers the disadvantages of using soluble resin and undesirable solvents. U.S. Pat. No. 4,211,528 also discloses use of sublimable disperse dyes in felt tip marker pens. In this example the inventor formulates a dye solution rather than a dispersion of the disperse dye particles. This was accomplished by use of chlorinated solvents which are environmentally unfriendly and would not be accepted in today's commercial market. In each of the above examples the composition also included a soluble resin.

Many additional disperse dye-based sublimation ink compositions are known in the industry, particularly for use with ink jet printers, and the intended application was sublimation printing of textiles or hard goods. For example U.S. Pat. No. 4,725,849 to Koike describes a disperse dye composition for inkjet printing directly onto cloth that has been treated with a hydrophilic resin. The particular ink compositions contained 20% or higher concentrations of solvent and this would be undesirable for commercial nib marker use. The inventors also provided no indication that such inks could be used in nib markers. U.S. Pat. No. 5,642,141 to Hale describes a process for inkjet printing heat activated inks onto an intermediate substrate and subsequently heat transferring that ink to a substrate similar to the Graphic Magicians earlier patent. The '141 patent claims a broad range of ink compositions suitable for the inkjet printing but interestingly does not reference the earlier '849 patent that includes the same compositions. There are numerous additional inkjet ink patents included in the reference material where the claims relate to disperse dye compositions with varying types of surfactants, dispersants or solvents. These inkjet ink compositions are usually designed to have viscosity higher than that which is suitable for the current invention. For example, U.S. Pat. No. 8,425,029 to Sawgrass specifically mentions on p. 2, column 45 that jet inks with heat activated solids should have a viscosity in the range of 7 to 30 cps.

In each case these inkjet ink compositions would not be suitable for use in consumer-based nib markers. It should be readily apparent that for broad consumer use, especially with children, the chemical composition criteria of the sublimation inks will necessarily be more stringent than for commercial or industrial inkjet sublimation inks. A first issue is the use of solvents and chemicals that are now considered either toxic or environmentally unfriendly. A second issue is the stability of the ink compositions. It is difficult to maintain long-term dispersion of pigment-based disperse dye sublimation inks. If the dye particles aggregate the inks will clog the nib causing failure. A third issue relates to maintaining an environmentally friendly solvent mixture that will not dry prematurely. A fourth issue is formulating an ink with low enough viscosity such that the ink is wicked at a desired rate but not so low that the ink will puddle when it first contacts the substrate. Jet inks with viscosity less than about 10 cps have a tendency to "pool" on nozzle face plates. A fifth issue is the inclusion of polymer components where the polymer can soften and adhere to a decorated item. A sixth issue particularly related to current inkjet inks is the inclusion of certain specialty chemicals necessary for proper long-term operation of ink jet pens but not required or desired if used in a consumer nib marker. A seventh issue is the percentage of water in the composition. It is desirable for the ink to be primarily aqueous based but this is not the case with most industrial use inkjet inks. Some or all of the forgoing issues are addressed by the compositions and processes as provided herein.

SUMMARY

Provided are low viscosity, non-clogging, consumer and environmentally friendly dye sublimation ink compositions that can be placed in a nib-based marker pen and where that nib-based marker pen may then be used to deposit the ink onto a substrate or other item to be decorated. In processes of decorating a substrate, the ink image is then optionally heated by a suitable means such that the heat transfer dye alone is transferred to the item to be decorated. In some illustrative aspects, the ink composition comprises from about 50 to 90% water, from about 5 to 45% water miscible solvent, from about 0.5 to 10% disperse or solvent heat transfer dye particles optionally of approximately 350 nm or smaller, from 0.1 to 5% pigment dispersant and optionally additional components such as biocides, surfactants, viscosity adjustors, pH adjusters, and UV light stabilizers.

DETAILED DESCRIPTION

Provided are processes of using a nib-based marking pen to deposit a heat transfer dye ink onto an intermediate substrate. The processes and marking pens utilized overcome prior issues by providing a functional and environmentally friendly system for allowing custom decorating of objects or surfaces. The processes utilize a nib-based marking pen. Nib-based marking pens are known in the art and are marking pens where by an ink composition is delivered from a storage chamber through or otherwise by a nib to a substrate or surface. As such, the term "nib-based" as used herein is intended to mean that the marking pen delivers the ink composition through a nib as it is recognized in the art.

The processes as provided utilize a nib-based marking pen to deliver ink in the form of an image to an intermediate substrate. Optionally, an intermediate substrate is plain paper, although the process is suitable for many other substrates that could include, but not be limited to: coated papers, plastic films, or metal sheets. The image may be optionally dried on the intermediate substrate. The imaged intermediate substrate is contacted on or directly on a surface or object to be decorated and heat applied such as via an iron, hot plate, heat transfer press or similar device or process such that the heat transfer dye is transferred from the intermediate substrate to the surface or object. The surface or object to be decorated optionally has a surface or composition that is receptive to sublimation dyes present in the ink. For example, the surface or object is optionally a textile that is receptive to these dyes or object that is coated with a polymer that is receptive to the dyes. Examples of polymers that may be receptive to heat transfer dyes of the disclosure include but are not limited to certain polyester, epoxy and polyamide polymers. In some aspects, the dye transfer requires a specific combination of heat, pressure and time to achieve the desired level of optical density.

In some aspects, the dye transfer is performed at a transfer temperature of 250° F. to 400° F. Optionally the transfer temperature is at least 250° F., optionally at least 275° F., optionally at least 300° F., optionally at least 325° F., optionally at least 350° F., optionally at least 375° F., optionally at least 400° F. Optionally, a transfer temperature does not exceed 400° F. In practice use of higher temperature requires less time to transfer a sufficient amount of dye. The exact amount of pressure will vary depending on the substrate to be decorated. Substrates with smooth surfaces will utilize lower pressure than a substrate with texture surface.

Also provided are processes of using a nib-based marking pen to deposit a heat transfer dye ink composition as provided herein directly onto an object that has a dye-receptive surface such as a polymer coated ceramic tile or other object. Optionally, a nonporous, non-ink receptive, heat resistant material is placed directly on the ink image and the dye transferred as in is described above.

Inks of the present disclosure include one or more disperse or solvent dyes that are solid at room temperature but sublime at elevated temperature. Particular examples of dyes are water insoluble and solid at room temperature. A great many disperse or solvent dyes are commercially available, although not all are suitable for delivery by a nib-based marking pen as is provided in this disclosure. Disperse dyes that are suitable for delivery by a nib-based marking pen include, but are not limited to: Disperse Yellow 3, 23, 27, 54, 82, 119, Disperse Orange 1, 3, 25, Disperse Red 1, 4, 9, 11, 13, 60, Violet 1,17, and Blue 3, 14, 19, 60, 72, 359, and 360. Examples of solvent dyes that will sublime under conditions suitable for this disclosure include, but are not limited to: Solvent Blue 35, Solvent Blue 36, Solvent Red 60, Solvent Red 111, Solvent Yellow 150, and Solvent Orange 60. Black sublimable dyes are typically combinations of one or more of the above dyes. A first requirement of a suitable dye is the ability to transfer at a specific range of temperature, pressure and time. The dyes must be free of impurities and toxic components, be environmentally friendly, and not a skin irritant. For child safe art use the inks must conform to ASTM-D4236 and/or European Toy Safety Directive EN 71. The dyes when deposited onto the final substrate optionally do not migrate or be soluble in skin oils. Optionally, the dyes provide long-term light stability.

In forming an ink as provided herein, the disperse or solvent dye (pigment, or heat transfer dye as used herein) is first milled with water and optionally a dispersant to produce a pigment concentrate of 10 to 30% pigment and with the desired pigment average particle size optionally of 5 to 400 nm where particle size is understood as that measured by a standard particle size analyzer as an equivalent sphere particle size. Particle size of a pigment is optionally 5 nm to 150 nm, 150 nm to 350 nm, optionally 200 to 350 nm, optionally 300 to 350 nm. The particular technique used to mill the dye particles can be one common to the pigment milling industry and could include (for example) ball mills, attritors, or continuous media mills.

In some aspects, the dye particles are modified. Optionally, the dye particles are encapsulated by a polymer such that they are self-dispersing in water. Optionally, a disperse dye may be modified by chemical treatment such that the treated pigment is self-dispersing in water. The disperse dye may optionally be treated with a silane or titanate compound to aid dispersion stability. Techniques for chemical treatment or encapsulating of dyes for improved dispersion are well known in the art. Optionally, an ink composition includes an additional dye or color pigment. One disadvantage of disperse dyes is that they have a particular hue when printed on a paper substrate. However, when transferred to the final object the hue and brightness can be significantly different. A solution to this issue is to include in the ink composition a dye or color pigment that has a hue more representative of the heat transferred image. Suitable colorants could include FDA approved food dyes or color pigments typically used in commercial inks, with the understanding that inks produced with these additional colorants must still meet the requirements under ASTM D4236 and/or EN 71. These colorants could be included during the initial disperse dye dispersion process or they could be added either as an aqueous solution or pigment dispersion during the final ink mixing process. The additional colorants are optionally present in an ink as proved herein at 0 to 10 wt %. Optionally an additional colorant is chosen from non sublimable consumer and environmentally friendly dyes and color pigments.

Optionally, an ink composition includes a dispersant. If a dispersant is used, the quantity and specific type will depend on the chemistry of the particular disperse dye and could range (typically) by weight from 0.1 to 50% of the weight of pigment. A dispersant is optionally present from 0.5 wt % to 50 wt %, optionally 0.1 to 10 wt %, optionally 0.1 to 5 wt %. The specific dispersant is limited to one that provides the desired pigment dispersion stability and also meets the environmental and safety criteria as described above. Optionally, a dispersant includes but is not limited to polymeric acrylic acids, oxazolines, ethoxylated compounds, silanes, titanates, and block and graft polymers. Optionally the type of dispersant is one not based on a polymer and could include organic compounds with polar functional groups such as carboxylic acid, ammonium, polyoxyethylene, or sulfonate. Oxalic and citric acid are two specific examples. Additional ink components, if desired, could be included during the process of preparing the dye dispersion or alternatively added during dilution of the dispersion.

The above dispersion may then be diluted with water, co-solvents, humectants, and additional ink components such that the final dye concentration will be in the 0.2% to 15% by weight, optionally 0.5 to 15% by weight, depending on the particular dye and its tintorial strength. The final concentration of water is optionally 70 to 95% by weight optionally at least 85% by weight water.

In some aspects, an ink composition includes one more co-solvents or humectant(s) that are water-miscible solvent or mixture of solvents. The co-solvent(s) or humectant(s) optionally reduces evaporation and prevents premature ink drying at the nib tip. The total quantity of water-miscible co-solvents or humectants may be in the 0.5-25% by weight range, optionally in the 0.5 to 10% by weight range. Examples of suitable co-solvents or humectants include alcohols such as ethanol or isopropanol, glycols such as polyethylene or polypropylene, glycerin, diols such as propanediol or pentanediol, dimethyl sulfoxide, or bio-derived solvents based on lactic acid.

An ink composition optionally includes one or more viscosity modifiers. A viscosity modifier is any suitable modifier imparting the desired safety characteristics to the ink composition and will result in the desired viscosity as described herein. Optionally a viscosity modifier is a polyethylene glycol of molecular weight less than 5000 Da that will contribute to a low viscosity ink. Optionally, PEG is less than 4000 Da, optionally less than 3500 Da, optionally less than 3000 Da.

The ink may also include additional components such as pH adjusters, surfactants, biocides, and light stabilizers. A ink composition optionally has a pH of 6.5 to 8. Each of these chemical components, if used, must meet the same environmental and safety criteria as mentioned for the dye. Although not required for the successful operation of the invention, it is preferred that an additional FDA approved dye or consumer friendly color pigment is included in the ink composition.

An ink composition as provided and used herein optionally has a desired viscosity as measured by a standard viscosity analyzer as used in the art. An ink composition optionally has a viscosity of at or less than 10 centipoise (cps). Optionally, an ink composition has a viscosity at or below 9 cps, optionally at or below 8 cps, optionally at or below 7 cps, optionally at or below 6 cps, optionally at or below 5 cps, optionally at or below 4 cps, optionally at or below 3 cps, optionally at or below 2 cps, optionally at or below 1 cps.

The following examples are provided as representative techniques for preparing dye transfer inks and their use in nib-based marking pens. They are illustrative but are not meant to define limitations of the process.

EXAMPLES

Example 1

A magenta ink was prepared by media milling Disperse Red 60 with a styrene acrylic acid dispersant for 24 hours to produce a pigment dispersion where the final dye concentration was approximately 16 wt %. The particle size of this dye averaged approximately 100 nm. This dispersion was diluted with distilled water, polyethylene glycol, and biocide such that the final formulation comprised 5% dye, 7% polyethylene glycol, 0.2% biocide and the remainder distilled water with all percents being weight percents. The final viscosity was approximately 1 cps. The ink was placed in a nib-based pen with a synthetic fiber nib such as those from Porex. An image was created by drawing with the pen onto plain paper. The inked image was placed in contact with a polyester shirt and the combination placed in a heat press for 30 seconds at 400° F. to produce a decorated shirt.

The ink was tested to confirm that it met ASTM-D4236, CFR1500.14(b) (LHMA) and EN-71 certification for child safety standards.

Example 2

The nib-based marker with magenta ink from above was used to write directly onto a polymer-coated ceramic tile. A non-porous heat-resistant parchment paper sheet was placed over the inked ceramic tile and an iron used to transfer the dye.

The foregoing description of particular aspects is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

We claim:

1. An ink composition comprising: water as a predominant by weight, a dispersant and a heat transfer disperse dye suitable for use to image an intermediate substrate, the dye has a particle size is less than 350 nm, the ink composition having a viscosity less than 10 cps at room temperature, and wherein the ink composition is child and environmentally friendly; and the ink composition within a hand held nib-based marker pen.

2. The ink composition according to claim 1 comprising from 0.5 wt % to 15 wt % heat transfer disperse dye, from 0.5 wt % to 25 wt % co-solvent, humectant and/or viscosity modifier, and from 75 wt % to 95 wt % water.

3. The ink according to claim 1 further comprising one or more pigment dispersants, biocides, viscosity modifiers, humectants, pH adjusters, defoamers, surfactants, and compatibilizers.

4. The ink according to claim 2 where the co-solvent or humectant is water miscible and is an alcohol, glycerin, glycol, or combinations thereof.

5. The ink according to claim 2 where the viscosity modifier or humectant is polyethylene glycol.

6. The ink according to claim 1 where the heat transfer disperse dye is C.I. Disperse Yellow 3, C.I. Disperse Yellow 23, C.I. Disperse Yellow 27, C.I. Disperse Yellow 54, C.I. Disperse yellow 82, C.I. Disperse Yellow 119, C.I. Disperse Orange 1, C.I. Disperse Orange 3, C.I. Disperse Orange 25, C.I. Disperse Red 1, C.I. Disperse Red 4, C.I. Disperse Red 9, C.I. Disperse Red 11, C.I. Disperse Red 13, C.I. Disperse Red 60, C.I. Disperse Violet 1, C.I. Disperse Violet 17, C.I. Disperse Blue 3, C.I. Disperse Blue 14, C.I. Disperse Blue 19, C.I. Disperse Blue 60, C.I. Disperse Blue 72, C.I. Disperse Blue 359, C.I. Disperse Blue 360, or a combination of two or more thereof.

7. The ink according to claim 1 further comprising up to 10 wt % of an additional colorant chosen from non sublimable consumer and environmentally friendly dyes and color pigments.

8. The ink according to claim 1 where the ink composition meets the standards for child safety use as defined by ASTM-D4236 and/or EN-71.

9. A decorative imaging process comprising:
applying an image to an intermediate substrate using a marker to form an inked intermediate substrate, the image formed of the ink composition of claim 1, wherein the marker is a hand held nib-based marker;
placing the inked intermediate substrate in contact with a dye receptive surface; and
transferring the ink composition or dye component thereof to the receptive surface by application of sufficient heat and pressure.

10. The process according to claim 9 where the ink composition comprises from 0.5 wt % to 15 wt % heat transfer disperse dye, from 0.5 wt % to 25 wt % co-solvent, humectant, and/or viscosity modifier, and from 75 wt % to 95 wt % water.

11. The process according to claim 9 where the ink composition includes one or more chemicals chosen from pigment dispersants, biocides, viscosity modifiers, humectants, pH adjusters, defoamers, surfactants, or compatibilizers.

12. The process according to claim 9 where the child and environmentally friendly aqueous based ink composition has a viscosity less than 2 cps.

13. The process according to claim 9 where the disperse dye has a particle size less than 350 nm.

14. The process according to claim 10 where the co-solvent or humectant is an alcohol, glycerin, glycol, or combination thereof.

15. The process according to claim 10 where the viscosity modifier or humectant is polyethylene glycol.

16. The process according to claim 9 where the heat transfer disperse dye is C.I. Disperse Yellow 3, C.I. Disperse Yellow 23, C.I. Disperse Yellow 27, C.I. Disperse Yellow 54, C.I. Disperse yellow 82, C.I. Disperse Yellow 119, C.I. Disperse Orange 1, C.I. Disperse Orange 3, C.I. Disperse Orange 25, C.I. Disperse Red 1, C.I. Disperse Red 4, C.I. Disperse Red 9, C.I. Disperse Red 11, C.I. Disperse Red 13, C.I. Disperse Red 60, C.I. Disperse Violet 1, C.I. Disperse Violet 17, C.I. Disperse Blue 3, C.I. Disperse Blue 14, C.I. Disperse Blue 19, C.I. Disperse Blue 60, C.I. Disperse Blue 72, C.I. Disperse Blue 359, C.I. Disperse Blue 360, or a combination of two or more thereof.

17. The process according to claim 9 where the ink composition further comprises up to 10 wt % of an additional colorant chosen from non sublimable consumer and environmentally friendly dyes and color pigments.

18. A process according to claim 9 where the ink composition meets the standards for child safety use as defined by ASTM-D4236 and/or EN-71.

19. A decorative imaging process comprising:
filling a hand held nib-based marker with the ink composition of claim 1;
applying an image to an item having a dye receptive surface using the marker to form an inked surface; and
heating the inked surface to allow the heat transfer disperse dye to migrate into the dye receptive surface.

20. The process according to claim 19 where the ink composition comprises from 0.5 wt % to 15 wt % heat transfer disperse dye, from 0.5 wt % to 25 wt % co-solvent, humectant, and/or viscosity modifier, and from 75 wt % to 95 wt % water.

21. The process according to claim 19 where the ink composition includes one or more chemicals chosen from pigment dispersants, biocides, viscosity modifiers, humectants, pH adjusters, defoamers, surfactants, and compatibilizers.

22. The process according to claim 19 where the ink composition has a viscosity of less than 2 cps.

23. The process according to claim 19 where the heat transfer disperse dye has a particle size less than 350 nm.

24. The process according to claim 20 where the co-solvent or humectant is water miscible and is an alcohol, glycerin, glycol, or combination thereof.

25. The process according to claim 20 where the viscosity modifier or humectant is polyethylene glycol.

26. The process according to claim 19 where the heat transfer disperse dye is C.I. Disperse Yellow 3, C.I. Disperse Yellow 23, C.I. Disperse Yellow 27, C.I. Disperse Yellow 54, C.I. Disperse yellow 82, C.I. Disperse Yellow 119, C.I. Disperse Orange 1, C.I. Disperse Orange 3, C.I. Disperse Orange 25, C.I. Disperse Red 1, C.I. Disperse Red 4, C.I. Disperse Red 9, C.I. Disperse Red 11, C.I. Disperse Red 13, C.I. Disperse Red 60, C.I. Disperse Violet 1, C.I. Disperse Violet 17, C.I. Disperse Blue 3, C.I. Disperse Blue 14, C.I. Disperse Blue 19, C.I. Disperse Blue 60, C.I. Disperse Blue 72, C.I. Disperse Blue 359, C.I. Disperse Blue 360, or a combination of two or more thereof.

27. The process according to claim 19 where the ink composition further comprises up to 10 wt % of an additional colorant chosen from non sublimable consumer and environmentally friendly dyes and color pigments.

28. The process according to claim 19 where the ink composition meets the standards for child safety use as defined by ASTM-D4236 and/or EN-71.

\* \* \* \* \*